2,746,992

DIALKYLAMINOALKYL-DIPHENYL-ACETANILIDES

Moses Wolf Goldberg, Upper Montclair, and Sidney Teitel, Nutley, N. J., assignors to Hoffmann-La Roche Inc., Nutley, N. J., a corporation of New Jersey No Drawing. Application April 9, 1954,
Serial No. 422,264

5 Claims. (Cl. 260—558)

This invention relates to N-diphenylacetyl-N-aryl-N',N'-dialkylalkylene diamines, particularly wherein the N-aryl group is a hydroxyphenyl or lower alkoxyphenyl group. The compounds of this invention may be represented by the following structural formula

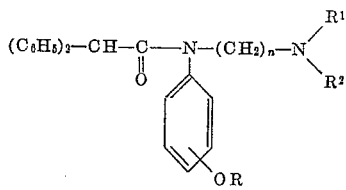

wherein R represents hydrogen or lower alkyl, $R^1$ and $R^2$ represent lower alkyl and $n$ represents an integer from 2 to 3.

The novel compounds are useful as vasodilators because of their papaverine-like, antispasmodic activity.

The basic amides of this invention may be synthesized by alkylating a substituted aniline with a diloweralkylaminoalkyl halide and reacting the N-aryl-N',N'-dialkylalkylene diamine thus obtained with a diphenylacetyl halide. The reactions may be effected in an organic solvent such as pyridine, benzene, toluene, acetone, acetonitrile and the like. The bases form acid addition salts with strong inorganic and organic acids such as hydrochloric acid, hydrobromic acid, sulfuric acid, phosphoric acid, toluenesulfonic acid, camphorsulfonic acid, citric acid, tartaric acid, oxalic acid, etc. The bases also form quaternary salts with alkyl halide quaternizing agents such as methyl bromide, ethyl bromide, etc.

The following examples are illustrative of this invention

Example 1

To 3.88 g. (0.02 mol) of N-(p-methoxyphenyl)-N',N'-dimethylethylenediamine dissolved in 75 ml. of dry pyridine was added a solution of 5.06 g. (0.022 mol) of diphenylacetyl chloride in 25 ml. of dry benzene. After refluxing for 3 hours, the yellow colored solution was kept at 4° for 15 hours. The crystals that had formed were filtered off, washed with benzene and dried. The crude hydrochloride of N-diphenylacetyl-N-(p-methoxyphenyl)-N',N'-dimethylethylenediamine melted at 242–245° C. (with dec.). Upon recrystallization from methanol-acetone-ether, the melting point of the hydrochloride was 245–246° C. (with dec.).

Example 2

3.5 g. (8.2 m. mole) of the hydrochloride of N-diphenylacetyl - N - (p - methoxyphenyl) - N',N' - dimethylethylenediamine was dissolved in water, the solution was made alkaline with sodium carbonate and extracted with ether. The ether extract was washed with water, dried with sodium sulfate and the ether was distilled off, leaving the free base, N-diphenylacetyl-N-(p-methoxyphenyl)-N',N'-dimethylethylenediamine, as a colorless oil.

50 ml. of a 25% solution (by weight) of methyl bromide in acetone was added to the free base obtained above dissolved in 25 ml. of acetone. After 5 minutes crystals formed. After storage overnight, the crystals were filtered off, washed with acetone and dried. The crystals of the methobromide of N-diphenylacetyl - N - (p - methoxyphenyl)-N',N'-dimethylethylenediamine were recrystallized from methanol-acetone-ether, M. P. 192–193° C.

Example 3

19.4 g. (0.1 mol) of N-(p-methoxyphenyl)-N',N'-dimethylethylenediamine was refluxed with 200 ml. of 48% hydbromic acid for 7 hours. The solution was evaporated to dryness and the residual gum crystallized by trituration with methanol. The crystalline compound thus obtained, the dihydrobromide of N-(p-hydroxyphenyl)-N',N'-dimethylethylenediamine, upon recrystallization from methanol-ether, melted at 195–197° C.

3.4 g. (0.01 mol) of the dihydrobromide of N-(p-hydroxyphenyl)-N',N'-dimethylethylenediamine was dissolved in water, saturated sodium bicarbonate solution was added and the free base extracted with ether. The ether extract was washed with water, dried with sodium sulfate and the ether distilled off, leaving the free base as an oil.

To the N-(p-hydroxyphenyl)-N',N'-dimethylethylenediamine obtained above, dissolved in 100 ml. of dry pyridine, was added a solution of 2.3 g. (0.01 mol) of diphenylacetyl chloride in 10 ml. of dry benzene. After refluxing for 3 hours, the light-brown colored solution was evaporated to dryness, and the gummy residue was distributed between aqueous sodium bicarbonate and ether. The ether layer was separated, washed with water and dried with sodium sulfate. An aliquot of the dry ether solution was distilled to remove the ether leaving a residue comprising essentially N-diphenylacetyl-N-(p-hydroxyphenyl)-N',N'-dimethylethylenediamine.

Hydrogen bromide gas was bubbled into the dry ether solution obtained in the preceding paragraph, giving a gummy precipitate. The ether was distilled off and the residual gum was crystallized by trituration with acetone. The hydrobromide of N-diphenylacetyl-N-(p-hydroxyphenyl)-N',N'-dimethylethylene-diamine was recrystallized from water-acetone-ether, M. P. 250–252° C. (with dec.).

Example 4

A mixture of 100 g. (0.73 mol) of p-phenetidine, 52.6 g. (0.365 mol) of β-dimethylaminoethyl chloride hydrochloride and 102 g. (0.73 mol) of anhydrous potassium carbonate in 400 ml. of dry toluene was stirred and refluxed for 22 hours. The reaction mixture was then cooled, water was added and the reaction product was extracted with ether. The ether solution was washed with water, dried with potassium carbonate and concentrated. Upon fractional distillation there was obtained N-(p-ethoxyphenyl)-N',N'-dimethylethylenediamine, b.$_{0.1}$ 110° C.

To 10 g. (0.048 mol) of N-(p-ethoxyphenyl)-N',N'-dimethylethylenediamine dissolved in 50 ml. of dry benzene was added a solution of 11.5 g. (0.05 mol) of diphenylacetyl chloride in 50 ml. of dry benzene. This solution was refluxed for 3 hours, then stored at room temperature overnight. The crystals that had formed were filtered off, washed with benzene and then with ether. The hydrochloride of N - diphenylacetyl - N - (p - ethoxyphenyl) N',N'-dimethylethylenediamine thus obtained was recrystallized from ethanol-acetone-ether, M. P. 202–203° C.

Example 5

N - (m - ethoxyphenyl) - N',N' - dimethylethylenediamine, b.$_{0.3}$ 117°, was obtained by reacting a mixture of 100 g. (0.73 mol) of m-phenetidine, 52.6 g. (0.365 mol) of β-dimethylaminoethyl chloride hydrochloride and 102 g. (0.73 mol) of anhydrous potassium carbonate in 400 ml. of dry toluene according to the procedure described in Example 4.

To 10 g. (0.048 mol) of N-(m-ethoxyphenyl)-N',N'-dimethylethylenediamine, dissolved in 50 ml. of dry benzene, was added a solution of 11.5 g. (0.05 mol) of diphenylacetyl chloride in 50 ml. of dry benzene. After refluxing for 10 minutes, crystals formed. The mixture was stirred and refluxed for 3 hours, then stored at room temperature overnight. The crystals were filtered off, washed with benzene, then with ether, and dried. Upon recrystallization from a mixture of methanol, benzene and ether, the hydrochloride of N-diphenylacetyl-N-(m-ethoxyphenyl)-N',N'-dimethylethylenediamine melted at 204–205° C. (with dec.).

Example 6

N - (o - ethoxyphenyl) - N',N' - dimethylethylenediamine, $b_{0.1}$ 99° C., was obtained by reacting a mixture of 100 g. (0.73 mol) of o-phenetidine, 52.6 g. (0.365 mol) of β-dimethylaminoethyl chloride hydrochloride, and 102 g. (0.73 mol) of anhydrous potassium carbonate in 400 ml. of dry toluene according to the procedure described in Example 4.

To 10 g. (0.048 mol) of N-(o-ethoxyphenyl)-N',N'-dimethylethylenediamine, dissolved in 50 ml. of dry benzene, was added a solution of 11.5 g. (0.05 mol) of diphenylacetyl chloride in 50 ml. of dry benzene. The solution was refluxed for 3 hours, then stored overnight at room temperature. The crystals that had formed were filtered off, washed with benzene and with ether, and were then dried. The hydrochloride of N-diphenylacetyl-N-(o-ethoxyphenyl)-N',N'-dimethylethylenediamine was recrystallized from methanol-benzene-ether, M. P. 187–188°.

Example 7

16.5 g. (0.1 mol) of p-butoxy aniline and 17.2 g. (0.1 mol) of β-diethylaminoethyl chloride hydrochloride were intimately mixed and maintained at 100° with occasional mixing for 8 hours. The cooled, black colored melt was dissolved in water, the solution was made alkaline with sodium carbonate and extracted with ether. The ether extract was washed with water, dried with sodium sulfate, and the ether was distilled off. The residual oil was then fractionally distilled to obtain N-(p-butoxyphenyl)-N',N'-diethylethylenediamine, $b_{2.5}$ 185–187°.

To 5.28 g. (0.02 mol) of N-(p-butoxyphenyl)-N',N'-diethylethylenediamine, dissolved in 75 ml. of dry pyridine, was added a solution of 4.6 g. (0.02 mol) of diphenylacetyl chloride in 25 ml. of dry benzene. The solution was refluxed for 3 hours, concentrated to dryness, and the residual gum was extracted with ether at pH 8.5. The ether extract was washed with water and dried with sodium sulfate. The ether was distilled from an aliquot of the dry ether extract to obtain a residue comprising essentially N-diphenylacetyl-N-(p-butoxyphenyl)-N',N'-diethylethylenediamine.

Hydrogen bromide gas was bubbled into the ether solution of N-diphenylacetyl-N-(p-butoxyphenyl)-N',N'-diethylethylenediamine obtained above until the solution was acid to Congo red. The gum that precipitated was crystallized by trituration with isophopanol. Recrystallization from a mixture of acetone (containing a trace of water) and ether gave white cottony needles of the hydrobromide of N-diphenylacetyl-N-(p-butoxyphenyl)-N',N'-diethylethylenediamine, M. P. 123–125° C.

Example 8

To 10 g. (0.045 mol) of N-(p-methoxyphenyl)-N',N'-diethylethylenediamine dissolved in 100 ml. of dry benzene was added a solution of 10.6 g. (0.046 mol) of diphenylacetyl chloride in 50 ml. of dry benzene. The solution was refluxed for 3 hours, the solvent was distilled off and the residual syrup crystallized from acetone-ether. The hydrochloride of N-diphenylacetyl-N-(p-methoxyphenyl)-N',N'-diethylethylenediamine was recrystallized from benzene-ether, M. P. 172–174° C.

Example 9

30 g. (0.2 mol) of 3-diethylaminopropyl chloride, 24.7 g. (0.2 mol) of p-anisidine and 75 ml. of benzene were heated at 130° in a sealed tube for 12 hours. The volatiles were distilled off, the residue rendered alkaline with sodium carbonate and extracted with ether. The ether extract was washed with water, dried with sodium sulfate, and the ether then distilled off. The residual oil was fractionally distilled to obtain N-(p-methoxyphenyl)-N',N'-diethyl-1,3-propanediamine, $b_{0.07}$ 125°.

8 g. (0.034 mol) of N-(p-methoxyphenyl)-N',N'-diethyl-1,3-propanediamine was reacted with 7.9 g. (0.034 mol) of diphenylacetyl chloride, according to the procedure described in Example 8. The hydrochloride of N-diphenylacetyl - N - (p - methoxyphenyl) - N',N' - diethyl-1,3-propanediamine, thus obtained, was recrystallized from acetonitrile-ether, M. P. 177–179°.

Example 10

7 g. (0.015 mol) of the hydrochloride obtained in Example 9 was dissolved in water. The solution was made alkaline with sodium carbonate and extracted with ether. The ether extract was washed with water, dried with sodium sulfate and the ether distilled off. A residual oil comprising essentially N-diphenylacetyl-N-(p-methoxyphenyl)-N',N'-diethyl-1,3-propanediamine remained.

The residual oil thus obtained was dissolved in 25 ml. of acetone and 50 ml. of a 45% solution (by weight) of methyl bromide in acetone was then added. After storage at room temperature for 48 hours, the volatiles were distilled off. The residual syrup was crystallized from 95% ethanol-ethylacetate-ether giving the dihydrate of the methobromide of N-diphenylacetyl-N-(p-methoxyphenyl)-N',N'-diethyl-1,3-propanediamine.

We claim:

1. A member of the group consisting of the free bases having the formula

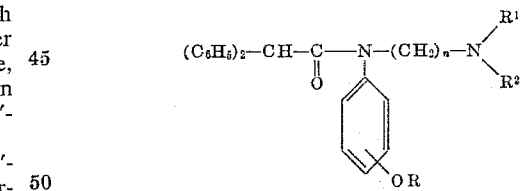

wherein R is a member of the group consisting of hydrogen and lower alkyl, $R^1$ and $R^2$ represent lower alkyl, n represents an integer from 2 to 3, acid addition salts of said bases selected from the group consisting of hydrochloride, hydrobromide, sulfate, phosphate, toluenesulfonate, camphorsulfonate, citrate, tartrate and oxalate, and lower alkyl quaternary halides of said bases.

2. N - diphenylacetyl - N - (p - methoxyphenyl) - N',N'-dimethylethylenediamine.

3. N - diphenylacetyl - N - (p - methoxyphenyl) - N',N'-dimethylethylenediamine hydrochloride.

4. N - diphenylacetyl - N - (p - ethoxyphenyl) - N',N' - dimethylethylenediamine hydrochloride.

5. N - diphenylacetyl - N - (m - ethoxyphenyl) - N',N' - dimethylethylenediamine hydrochloride.

References Cited in the file of this patent

UNITED STATES PATENTS

| | | |
|---|---|---|
| 2,009,144 | Miescher et al. | July 23, 1935 |
| 2,629,736 | Krimmel | Feb. 24, 1953 |

OTHER REFERENCES

Villani et al.: "J. Am. Chem. Soc.," vol. 72, June 1950, pp. 2724–27.